March 19, 1929.　　M. M. GOLDBERG　　1,705,662

CASH REGISTER

Filed Sept. 26, 1923　　7 Sheets-Sheet 1

Inventor
Maximilian M. Goldberg
By Carl Beust
Henry E. Stauffer
His Attorneys March 19, 1929.  M. M. GOLDBERG  1,705,662

CASH REGISTER

Filed Sept. 26, 1923  7 Sheets-Sheet 3

Inventor
Maximilian M. Goldberg
By Carl Beust
Henry C. Stauffer
His Attorneys

March 19, 1929.  M. M. GOLDBERG  1,705,662
CASH REGISTER
Filed Sept. 26, 1923    7 Sheets-Sheet 5

Inventor
Maximilian M. Goldberg
By Earl Beust
Henry E. Stauffer
His Attorneys

March 19, 1929.  M. M. GOLDBERG  1,705,662
CASH REGISTER
Filed Sept. 26, 1923  7 Sheets-Sheet 6

Inventor
Maximilian M. Goldberg
By Carl Bennett
Harry C. Stauffer
His Attorneys

March 19, 1929.  M. M. GOLDBERG  1,705,662
CASH REGISTER
Filed Sept. 26, 1923  7 Sheets-Sheet 7

Inventor
Maximilian M. Goldberg

Patented Mar. 19, 1929.

1,705,662

UNITED STATES PATENT OFFICE.

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed September 26, 1923. Serial No. 664,906.

This invention relates to cash registers and is illustrated in connection with a machine of the type shown and described in Letters Patent of the United States issued to Thomas Carney, May 23, 1893, and numbered 497,860, and also in United States Letters Patent to E. J. Von Pein, No. 1,371,653, issued March 15, 1921.

The principal object of this invention is to provide an accounting machine mechanism for recording on an issuing strip items and totals of items, together with desirable wording from electros, and simultaneously recording a total upon a record strip retained in the machine.

A further object of this invention is to provide means whereby several transactions entered in a recording totalizer are added and a total printed, and coincident with the same operation all amounts previously entered therein are removed therefrom and the parts brought to zero position.

Another object of this invention is to provide positive means for setting the total type wheels from the totalizer.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Figs. 1^A and 1^B taken together constitute a plan view of the machine.

The embodiment illustrated comprises the usual amount keys, means for entering amounts in a totalizer and for printing the same on an issuing strip, means for printing the total of said amounts on said issuing strip and also on a record strip retained in the machine, and mechanism for indicating the amounts as they are entered.

Figure 1:
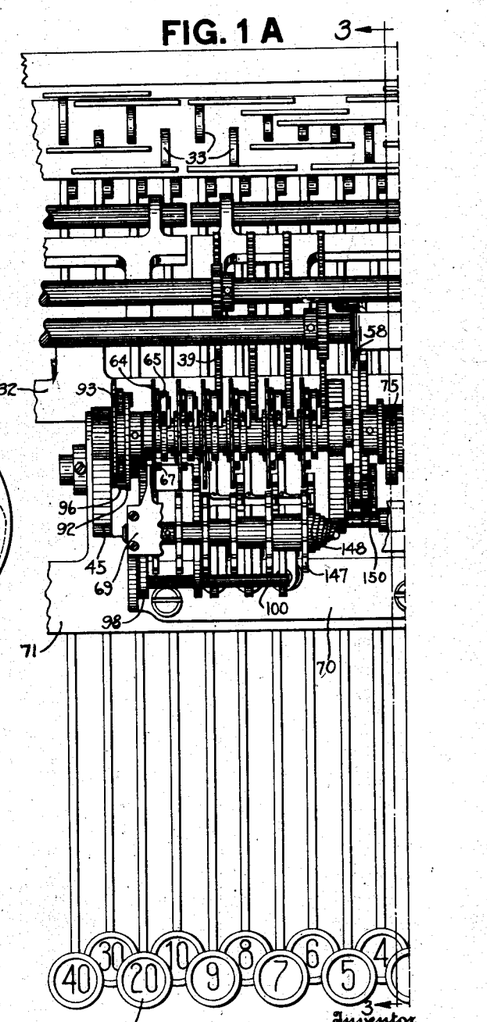
Figures 3, 4, 5, 6, 7:
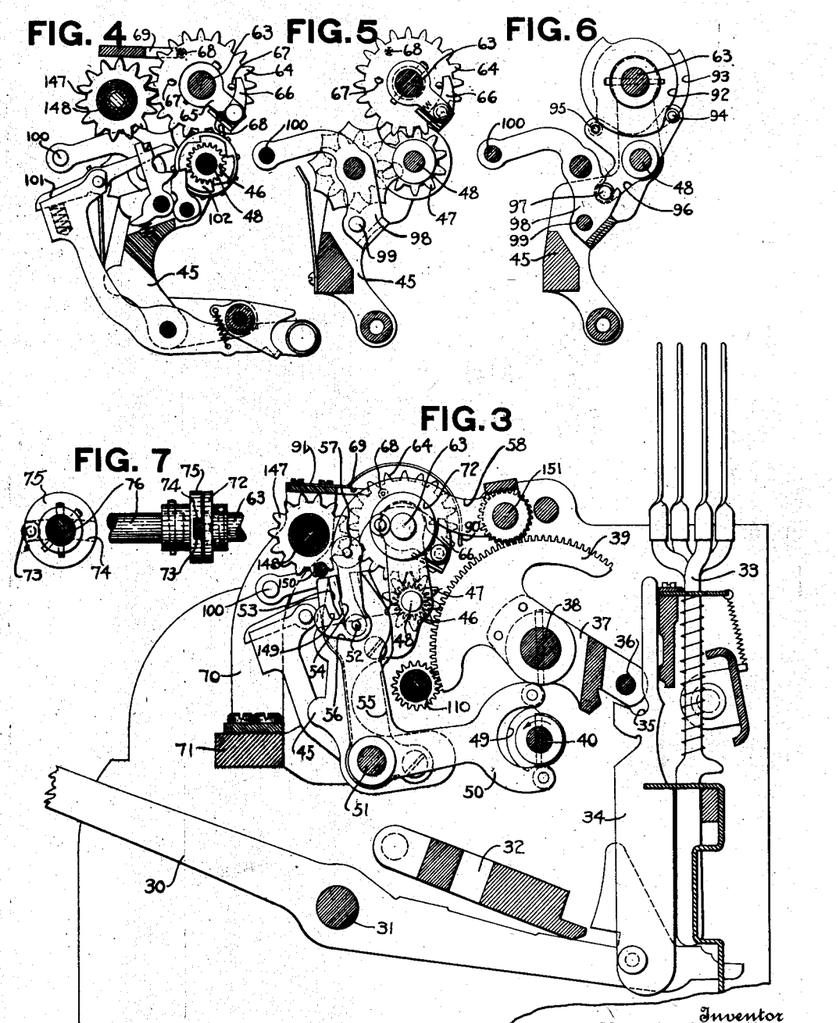
Fig. 3 is a transverse sectional view of the machine taken on the line 3—3 of Fig. 1^A.
Fig. 4 is a detail sectional view of the totalizer taken to the right of the fraction wheel and in position to set up the total type wheels.
Fig. 5 is a detail sectional view of the totalizer showing the auxiliary transfer mechanism.
Fig. 6 is a detail sectional view of the totalizer showing the mechanism for disengaging the auxiliary transfer mechanism.
Fig. 7 shows detail front and end views of the totalizer reset shaft clutch.

Referring especially to Figs. 1^A, 1^B, and 3, the invention is shown in connection with the well known lever key type of machine. The keys 30, arranged in denominational groups as usual, are pivoted on a transverse rod 31 carried by the side frames of the machine, and at their rear ends are notched to cooperate with a lip on a key coupler 32 for purposes well known in the art.

The rear ends of the keys support tablet indicators 33, which when the keys are operated will be raised and retained in a display position in a manner well known in the art.

Uprights 34, connected to the rear ends of the keys, are provided with notches 35 for engaging rods 36 carried by rocker members 37 supported on a shaft 38. There is a rocker member for each denominational group of keys, and each of the members is operatively connected to its registering segment or totalizer actuator 39. The notches in the uprights 34 are located to transmit amounts of movement to the actuators proportionate to the number of units represented by the keys to which the uprights are connected.

Operation of an amount key causes a cam shaft 40 to make one complete revolution. The mechanism for driving said shaft is not shown here but is clearly illustrated and described in the Von Pein patent previously referred to.

Totalizer.

The amounts represented by the keys depressed, are entered in a totalizer 45 (Figs. 3 and 4), which is of a well known type. The totalizer elements comprise pinions 46 rigid with the gear wheels 47 and other necessary elements supported on a shaft 48.

Figure 19:
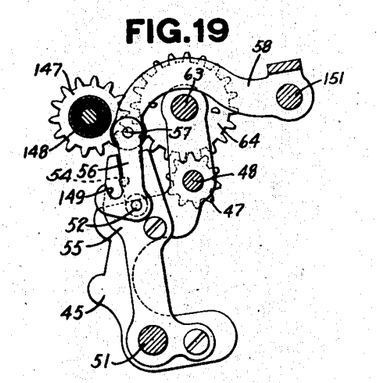
Fig. 19 is a detail view showing a portion of the mechanism for rocking the totalizer on total printing operations.
Figure 20:
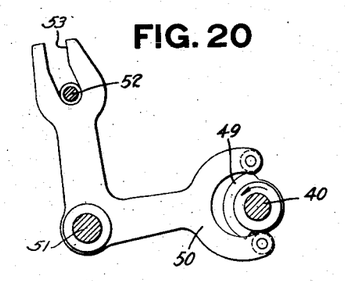
Fig. 20 is a detail of a part of the mechanism omitted from Fig. 19.

The totalizer is rocked into mesh with the actuators by a cam 49 secured to the shaft 40 and cooperating with two rollers carried on a bell crank lever 50 which is loosely mounted on a rod 51 and connected to the totalizer by a pin 52 normally engaging the bottom of an angular slot 53 (see also Fig. 20), formed in the bell crank lever 50 and a straight slot 54 (see also Fig. 19), in a plate 55 which is rigidly secured to the totalizer. The pin 52 is mounted in a link 56 pivoted at 57 to an arm 58 which will hereinafter be described.

In addition to the regular elements in the totalizer there is provided a shaft 63 upon which are freely mounted gears 64 meshing with the gear wheels 47. These gears are for the purpose of connecting the totalizer elements with mechanism to set up total type wheels to print the amount accumulated on the totalizer, all of which will hereinafter be described.

In a total printing operation the totalizer elements are returned to their normal or zero position by rotating the shaft 63 162° in a counter-clockwise direction. For each gear 64 there is pinned to the shaft 63 an arm 65 carrying a spring-actuated pawl 66 which cooperates with a flat sided pin 67 to move the gear 64 and turn the corresponding totalizer element to zero position.

With a totalizer element in the zero position, the relation between the pin 67 and pawl 66 is such that the gear 64 will not be moved when the shaft 63 is rocked. But when a totalizer element is advanced one position, the pin 67 will be moved ahead of the end of pawl 66 so that the pawl will engage the flat side of the pin and move the gear 64 162°, or nine divisions of the totalizer wheel. When a totalizer element is advanced two or more positions, the pawl will engage the pin 67 as it moves counter-clockwise and cause the gear to move in unison with the pawl the remainder of the reset movement.

Each gear 64 (Figs. 3, 4 and 5) is provided with two stop pins 68 placed 180° apart to engage a plate 69 to stop the totalizer element in its zero position during the total printing operation. This plate is secured to a bracket 70 supported by a cross member 71 of the machine frame. The shaft 63 (Figs. 3 and 7) has secured to one end a disk 72 which carries a roller 73 cooperating with a groove 74 in a companion disk 75 pinned to a shaft 76. This latter shaft is supported by the bracket 70 and a printer frame 77 (Fig. 1$^B$). Securely mounted on the shaft 76 and near the right hand end is a gear 78 which meshes with a segment arm 79 freely mounted on a rod 85 (Figs. 1$^B$ and 8). This segment arm is rocked by two rearwardly extending arms 80 and 81 carrying rollers engaging cams 82 and 83 fast to and revolving with a shaft 84 which receives one complete rotation during a total printing operation.

The coupling connection between the shafts 63 and 76 (Fig. 7) permits the shaft 76 to be mounted in rigid supports while the shaft 63 is mounted in a rocking totalizer frame. The shafts and couplings are shown in operative relation to each other.

Figure 21:
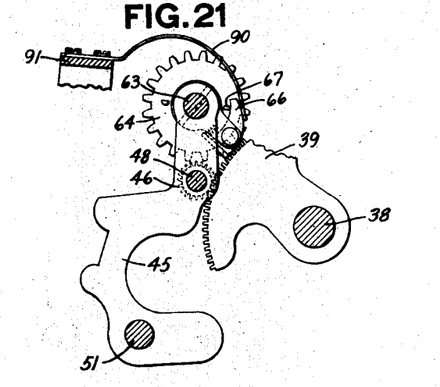
Fig. 21 shows the totalizer in its engaged position on item entering operations, with the resetting pawl in its braking position.

Over-rotation of the totalizer wheels in adding operations, causing a tripping of the transfer elements of the wheel of next higher order as a totalizer wheel moves to the ninth position, is prevented by a plate 91 secured to the plate 69 (Figs. 3 and 21). This plate has arms 90 which are engaged by the pawl 66 as the totalizer moves into engagement with the actuators, thereby causing the pawls 66 to bear upon the pins 67 (Fig. 5) to produce a retarding effect upon the totalizer wheels as they move into the ninth position.

The Geneva transfer mechanism (Fig. 5) is disengaged from the totalizer elements during resetting operations by two cams 92 and 93 (Fig. 6) secured on the shaft 63 and engaging rollers 94 and 95 carried on a member 96 pivoted on the shaft 48. Projecting laterally from this member is a pin 97 engaging a slot in a yoke member 98 pivoted on a rod 99 and supporting parts of the transfer mechanism. The yoke member 98 supports a rod 100 (Figs. 1$^A$, 4, 5 and 6) which is adapted to engage the regular transfer pawls 101 to prevent them from tripping into transfer position when the totalizer is reset to zero.

The totalizer wheel shown in Fig. 4 is for the fractional group of keys shown in Fig. 1$^B$, and has a ratchet wheel 102 with only four divisions, while the remainder of the totalizer wheels are equipped with regular ratchet wheels of ten divisions each. A complete rotation of this fractional wheel causes the transfer mechanism to enter one unit on the second wheel.

Item printing.

Figures 14, 15, 16, 17:
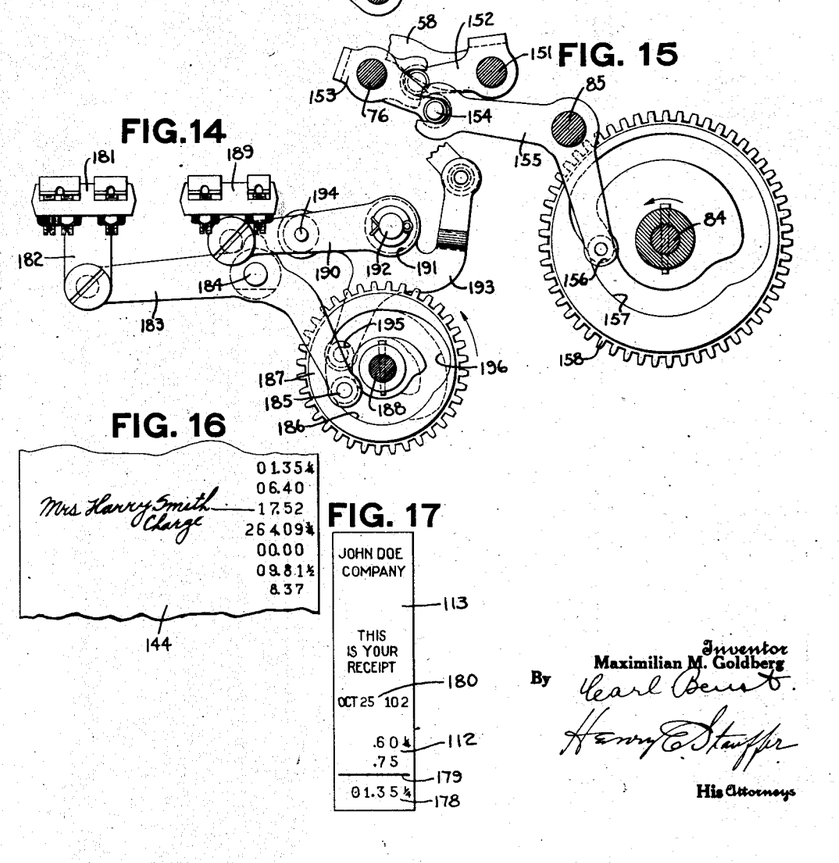
Fig. 14 is a detail view of the receipt printing impression means.
Fig. 15 is a detail view of the mechanism for rocking the totalizer into engagement with the total type wheel setting mechanism.
Fig. 16 shows a fragmentary portion of the autographic strip.
Fig. 17 is a view of a receipt issued by the machine.
Figure 18:
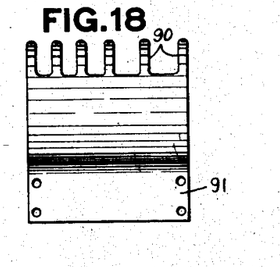
Fig. 18 is a detail view of the totalizer overrotation preventive plate.

The totalizer actuators are normally in mesh with gears 110 (Fig. 3) which are operatively connected with the item type wheels 111 (Fig. 10) by telescopic sleeves to adjust the type wheels to print the items 112 on the issuing receipt 113 (Fig. 17).

The cam shaft 40 (Figs. 3 and 8) extends through the right hand side frame. A cam 114 fixed to this shaft cooperates with a spring-pressed pivoted impression hammer supporting arm 115 which is offset to extend through an opening in the printer frame 77 (Fig. 10) into operative relation with the item type wheels 111. By means of this mechanism the items 112 (Fig. 17) are printed upon the receipt 113.

The receipt 113 is severed from a strip fed from a supply roll and under a guard 116 (Fig. 10) between the type printing wheels and the impression platens. Before an item is printed the issuing strip is fed forward one space by a roller 117 cooperating with a second roller 118 carried on a spring-pulled arm 119. The roller 117 is rotated by a pawl 120 engaging a ratchet (not shown) secured to the roller. The pawl 120 is carried on a bell crank arm 121 which is secured to the right hand trunnion 122 of the key coupler. The usual spring-actuated pawl 123 cooperates with said ratchet to prevent a retograde movement of the feeding roller.

An inking ribbon 124 passes between the type carriers and the paper, over the usual guide pins and partly around a feed roller 125 which is rotated by the usual pawl and ratchet device actuated by a link 126 connected to the bell crank arm 121. The ribbon is held taut by a roller supported by an arm 127.

Figures 10, 11, 12:
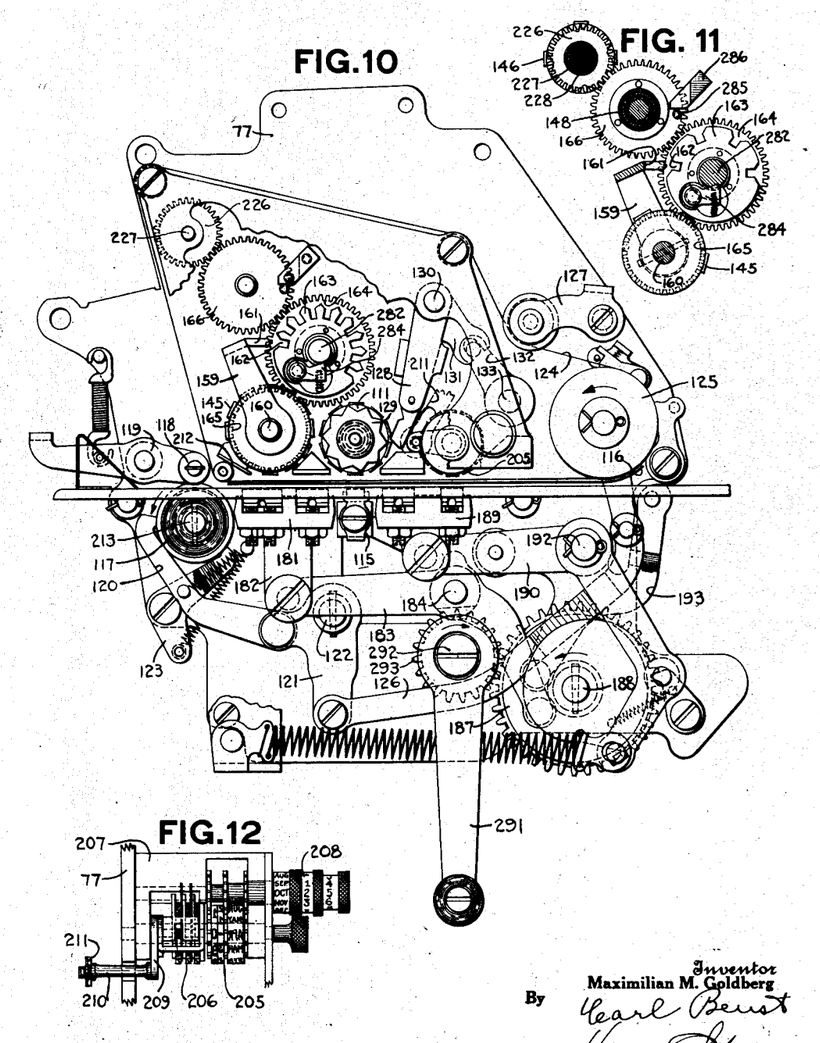
Fig. 10 is an elevational view of the receipt printing mechanism.
Fig. 11 is a detail view of the total type wheel actuating gears.
Fig. 12 is a detail view of the date and consecutive number device.

At the time the impression hammer carried by the arm 115 (Fig. 10) is cooperating with the item type wheels 111 to print an item the usual alining member 128 is rocked into engagement with alining disks 129 secured to the type wheels. This alining member 128 is pivoted on a rod 130 and has a bifurcated arm 131 engaging a pin carried by an arm 132 which is secured to a rod 133 supported by the frame of the machine. There is also secured to the rod 133 (Fig. 8) a two-arm plate 134 which engages a cam 135 to operate the alining member 128 (Fig. 10).

Total printing.

A total of the items 112 printed on the receipt 113 (Fig. 17) is accumulated on the totalizer and then by a separate operation is printed on the receipt and also upon the record strip 144 (Fig. 16) retained within the machine. For this purpose, mechanism is provided for positively setting up total printing wheels 145 (Fig. 10) for printing on the receipt and a second set of total type wheels 146 (Figs. 1B, 8 and 11) for printing on the record strip 144 (Fig. 16). For this purpose also, the gears 64 (Figs 3, 4, 19 and 20) mounted in the totalizer frame, and constantly in mesh with the totalizer elements, as hereinbefore described, are rocked into engagement with gears 147 secured to the left hand ends of telescopic sleeves 148 supported in the bracket 70 and the printer frame 77 and having secured to their right hand ends gears 166 (Figs. 10 and 11) which mesh with intermediate gears 164. These intermediate gears are also in mesh with gears 165 which are secured to the total printing wheels 145 freely mounted on a shaft 160.

During the total printing operation and previous to resetting the totalizer elements to zero, the pin 52 (Figs. 3, 19 and 20) is moved upward in the slots 53 and 54. The angular slot 53, being in the bell crank arm 50, which is held rigid during the total printing operation, guides the pin 52 so that its movement in the straight slot 54 in the plate 55 secured to the totalizer frame rocks the gears 64 into mesh with the gears 147.

As the pin 52 reaches its uppermost position, a notch 149 in the link 56 moves over a pin 150 projecting laterally from the bracket 70 and provides a means for rigidly holding the gears 64 and 147 in mesh during the time the totalizer elements are reset.

The arm 58 which carries the link 56 is freely mounted on a rod 151 and is yoked to an arm 152 (Fig. 15) carrying a roller engaging a slot in a yoked member 153 pivoted on the rod 76. This yoke member 153 carries a roller 154 engaging the bifurcated end of a bell crank arm 155 pivoted on the rod 85. The lower end of this bell crank arm carries a roller 156 engaging a cam race 157 formed in the side of a gear 158 pinned to the shaft 84.

Figure 2:
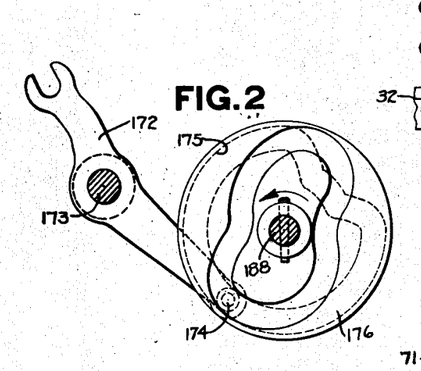
Fig. 2 is a detail view of the total type wheel alining pawl cam and arm.

With the gears 64 and 147 (Figs. 4 and 19) in mesh, the totalizer elements are reset to zero position. This causes the total printing wheels 145 (Fig. 10) to be set to positions corresponding to the amount accumulated on the totalizer before it is reset. After the total printing wheels have been adjusted, they are retained by an alining member 159 (Figs. 10 and 11) secured to the shaft 160. This alining member has projections 161 engaging slots 162 in plates 163 secured to the gears 164. The shaft 160 (Figs. 8, 10, and 11) is rocked by an arm 170 pinned thereto. This arm carries a pin 171 engaging a bifurcated end of a lever 172 pivoted on a pin 173 supported by the side frame. The lower end of the lever 172 carries a roller 174 (Fig. 2) engaging a cam race 175 formed in the side of a disk 176 pinned to a shaft 188.

While the total printing wheel aliner is in engagement, the totalizer is rocked out of engagement with the gears 147 (Fig. 4). The elements of the totalizer now being in their zero positions, the totalizer is in condition to receive items of the next transaction.

During the time the aliner 159 is retaining the total printing wheels in adjusted positions, impression platens are operated to print the total 178, the horizontal line 179, date and consecutive number 180, and any desired matter from two electros, upon the receipt 113 (Fig. 17).

Platen bearing member 181 (Figs. 10 and 14) which prints the total, horizontal line, and the name of the company, shown on the receipt, is secured to a downwardly extending arm 182 pivoted to a lever 183 which is fulcrumed on a stud 184 projecting from the printer frame. The lower end of the lever 183 carries a roller 185 cooperating with a cam race 186 to operate the platen bearing member 181. The cam race is formed in the outside face of a gear wheel 187 pinned to a shaft 188.

Another platen bearing member 189 which prints the consecutive number, date, and words characterizing the receipt, shown on the receipt, is pivoted to an arm 190 secured to a hub 191 freely mounted on a stud 192 supported by the printer frame. Secured to the other end of hub 191 is a three-armed lever 193 which, in addition to the hub, is connected to the arm 190 by a rod 194. The downwardly extending arm of the lever 193 carries a roller 195 cooperating with a cam race 196 formed in the inside face of the gear 187 to operate the platen bearing member 189.

The date printing wheels 205 (Figs. 10 and 12) and the consecutive number printing wheels 206 are mounted in a frame member 207 secured to the printer frame. The date wheels are set by the usual setting knobs 208. The consecutive number wheels are operated by the usual step-by-step pawl and ratchet mechanism. An oscillating frame 209, which carries the consecutive number feed pawl, has a laterally extending pin 210 which is connected by a link 211 (Figs. 8, 10 and 12) to the segment arm 79 previously described.

When printing a total it is necessary to feed the issuing strip or receipt 113 (Fig. 17) at two different intervals. The first feeding is for the purpose of moving the last printed item toward the front of the printer and past a member 212 (Fig. 10) which prints the horizontal line 179 on the receipt. The second feeding of the strip is after the total is printed to move the strip forward to the severing position.

During these feeding operations the feed roller 117 (Fig. 10), which is pinned to a shaft 213, is rotated by a pawl 214 (Fig. 8) which cooperates with a ratchet 215 pinned to the shaft 213. The pawl is carried on an arm 216 pivoted on the shaft 213 and rigidly connected to a gear 217 (Fig. 9) in mesh with a segment lever 218. The lower end of the segment lever carries a roller 219 (Fig. 8) engaging a cam race 220 formed in the side of a gear 221 pinned to the shaft 188.

Figure 8:
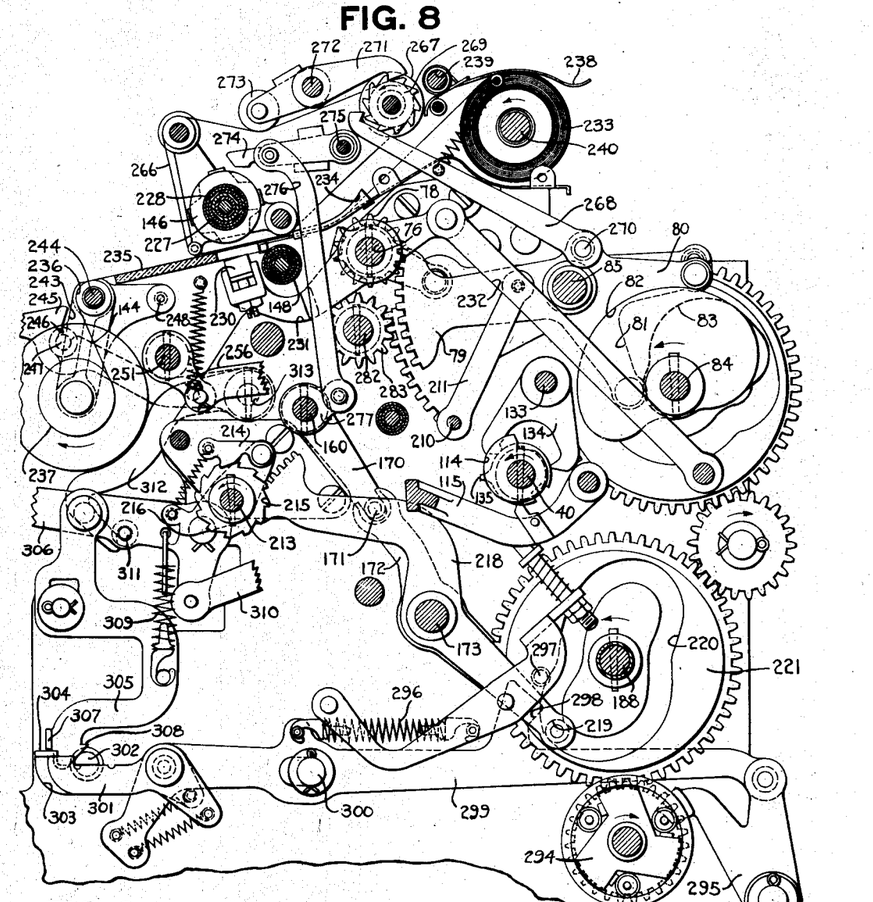
Fig. 8 is a transverse sectional view of the machine taken on the line 8—8 of Fig. 1^B.
Figure 9:
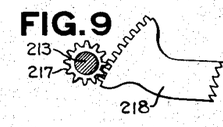
Fig. 9 is a detail view of the receipt feed roller driving gear and segment.

The gears 166 (Figs. 10 and 11) are in mesh with pinions 226 which are secured to the right hand end of a shaft 227 and telescopic sleeves 228 surrounding said shaft. Secured to the left hand end of these sleeves are the printing wheels 146 provided to print on the total record strip 144 (Figs. 8 and 16).

The total is printed upon the total record strip by means of a platen 230 carried by a lever 231 fulcrumed on the shaft 63 and connected by a link 232 to the three-armed lever 193 (Fig. 10).

The total record paper 144 is of sufficient width to provide ample space for written memoranda in connection with the printed total. This strip is fed from a supply roll 233, through a guide 234 between the printing wheels 146 and the platen 230, over a writing table 235, around a roller 236 and onto a receiving roll 237. The paper is kept taut by a spring tension plate 238 freely mounted on a stud 239 supported by the printer frame. The supply roll 233 is supported by a stud 240 projecting from the printer frame. A spring-pressed washer 241 (Fig. 1$^B$) maintains the supply roll in its lateral position with the left hand end of the roll bearing against a retaining nut 242.

Figure 13:
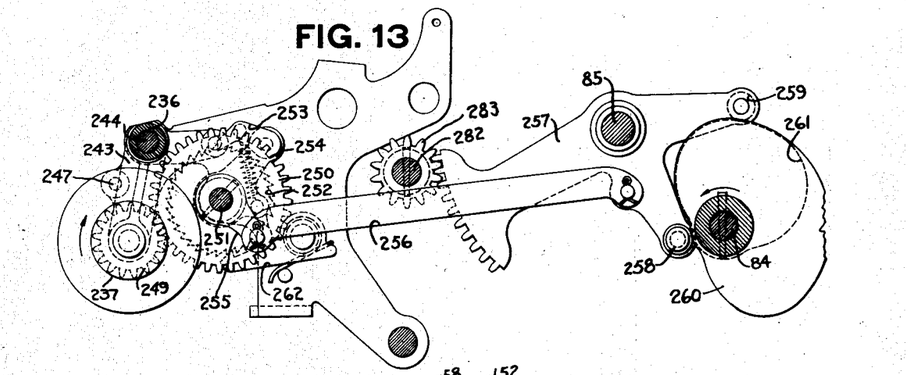
Fig. 13 is a detail view of the autographic paper-winding device.

The receiving roll 237 (Figs. 1$^B$, 8 and 13) is supported by an arm 243 pivoted on a rod 244, the left hand end of which is supported by the bracket 70 and the right hand end by the printer frame 77. The arm 243 is held in normal position by a spring-pulled latch 245 having a slot 246 engaging a pin 247 projecting from the arm. To remove the paper from the roll the latch is disengaged from the pin 247, permitting the arm 243 to be moved clockwise to a position wherein a pin 248, also carried by the arm 243, engages the slot 246 and retains the receiving roll in its elevated position while the paper is being removed.

During each total printing operation, the receiving roll 237 (Fig. 13) receives a clockwise movement to wind the paper and properly space the printing. Secured to the roll is a pinion 249 normally in mesh with a gear 250 freely mounted on a shaft 251. Fastened to the gear is a ratchet wheel 252 which cooperates with a spring-pulled pawl 253 to move the gear 250 counter-clockwise. The pawl is pivoted on an arm 254 secured to the shaft 251. The shaft is rocked by an arm 255 connected by a link 256 to a segment lever 257 fulcrumed on a stud 85. The segment lever carries rollers 258 and 259 cooperating with cams 260 and 261 secured to the shaft 84. A spring-pressed pawl 262 prevents retrograde movement of the receiving roll mechanism.

An inking ribbon 266 (Fig. 8) passes between the printing wheels 146 and the record strip 144. This ribbon passes over guide rollers and partially around a feeding roller 267 which is moved in a counter-clockwise direction by a pawl 268 cooperating with a ratchet wheel 269 secured to the roller. The pawl is pivoted on a pin 270 mounted in the segment lever 80. A retaining pawl 271 on a stud 272 prevents retrograde movement of the feeding roller 267. Also mounted on the stud 272 is a frame carrying a ribbon tension roller 273.

During the time that the impression is made upon the record strip by the platen 230, an alining member 274 is moved into engagement with notched plates secured to the sides of the printing wheels 146. This alining member is pivoted on a stud 275 and is operated by a link 276 the upper end of which is pivotally connected to the alining member and the lower end to an arm 277 pinned to rod 160, which is rocked during the total printing operation as previously described.

After the total is printed upon the receipt and the record strip, the alining member 159 (Figs. 10 and 11) is disengaged from the plates 163 and both groups of total printing wheels are returned to their zero or normal positions by rotating a shaft 282 upon which the gears 164 are rotatably mounted. This shaft is first rotated counter-clockwise and then clockwise by the segment lever 257 (Fig. 13), which is in mesh with a pinion 283 pinned to the shaft 282.

The shaft 282 (Fig. 11) has a groove which, as the shaft moves clockwise, engages the ends of spring-pressed pawls 284 carried on the wheels 164 and causes these wheels and their associate wheels to return to their normal positions. Each gear 166 has a laterally projecting pin 285 which cooperates with a slotted bar 286 to stop the gears 166 and the rotating members associated therewith in their normal position.

*Driving mechanism.*

The total printing mechanism may be operated by a crank 291 (Fig. 10). This crank is freely mounted upon a stud 292 and is suitably connected to a pinion 293 meshing with the gear 187 pinned to the driving shaft 188.

This mechanism may also be operated from an electric motor, of the same construction as that shown in the E. J. Von Pein application, Serial No. 458,510, and in Letters Patent of the United States to Kettering and Chryst, No. 1,144,418, granted June 29, 1915. Only the clutch member 294 (Fig. 8) of the motor is shown in this application. A lock lever 295, similar to the lock lever in said patent, releases the motor when moved clockwise by a spring 296, and arrests the motor when moved counter-clockwise by a pin 297 mounted in the gear 221. This pin cooperates with a projection 298 on a link 299 connected to the lock lever 295 and guided on a stud 300.

The spring 296 is connected to the frame and to the slidably mounted link. The link is normally held in the position shown in Fig. 8 by a spring-actuated catch 301 engaging behind a stud 302 on the frame of the machine. An arm 303, also spring-actuated, is provided with a lip 304 in engagement with the end of the hook portion of the catch 301. A catch member 305, pivoted on a motor or release key 306 (Figs. 1B and 8), is provided with a laterally directed fin 307 in alinement with the lip 304. This catch member is also provided with a shoulder 308 to cooperate with the stud 302. When the catch member 305 is moved downwardly by depressing the motor key, the catch 301 is released and the lock lever 295 is removed to releasing position. When the lock lever is returned to locking position the parts move back to the position shown in Fig. 8. A tension spring 309 holds the catch against the stud 302 and the motor key in its normal position. A link 310, which is only partially shown, connects the motor key 306 with an interlocking mechanism to prevent a simultaneous operation of item keys and the motor key. All of this mechanism is substantially identical with that shown in the application referred to.

The motor or control key carries a pin 311 which cooperates with an arm 312 pinned to a rod 313, to which is also secured the receiving roll arm latch 245. This mechanism provides an interlock between the motor key and the receiving roll arm latch. When the latch is out of normal position the motor key is inoperable, and when the motor key is depressed the latch cannot be manipulated. The pin 248 is spaced farther from the shaft 244 than the pin 247 so that in its moved position it holds the latch out of normal position, thereby preventing operation of the motor key.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, in combination, a movable totalizer frame provided with a slot, a driving means provided with a slot, a rocking member operated by said driving means, a member engaging said slots, and means for moving said engaging member to cause said totalizer frame to move.

2. In a machine of the class described, in combination, a totalizer, a totalizer frame provided with a slot, a totalizer actuator, a driving means, a rocking member provided with a slot and operated by said driving means, means connecting said slots, recording elements, and means for moving said slot connecting means to cause said totalizer to move into operative position with respect to said elements.

3. The combination of a totalizer, means for entering items therein, means for clearing said totalizer, a slotted member rigid with said totalizer, a second slotted member operated by said item entering means, and means cooperating with the slots in said members for rigidly connecting the same and for causing relative movement between the same when moved during totalizer clearing operations.

4. In a machine of the class described, a pivoted totalizer frame, a reset shaft carried by said frame, a driving shaft for said reset shaft mounted in fixed bearings, a driving pin carried by said driving shaft, and means rigid with said reset shaft and provided with a groove concentric with the pivot of said totalizer frame, to receive said driving pin.

5. In a machine of the class described, in combination, a movable totalizer frame, a totalizer wheel adapted to be reset to zero, a resetting shaft supported in said totalizer frame, a slotted member secured to said resetting shaft, a shaft mounted in rigid bearings, means for operating said shaft, and means secured to said shaft and cooperating with said slot to operate said resetting shaft.

6. A rotatable totalizer element, means for rotating said element to zero, and means for causing said first mentioned means to exert a braking effect upon said rotatable element as said element moves into its nine position during the entry of amounts thereon.

7. A rotatable accumulating element, a rotatable element geared thereto, a pawl for rotating said latter element, and means for exerting pressure on said pawl to produce a braking effect on said second mentioned element as said first mentionel element moves into its nine position in accumulating items.

8. In a machine of the class described, in combination, a totalizer frame, a totalizer wheel having ten positions, namely "0" to "9", an actuator, means for engaging said totalizer wheel with said actuator, an oscillating shaft, a gear supported by said shaft and in engagement with said totalizer wheel for rotating the wheel, and means cooperating with said gear to retard said totalizer wheel in its movement into the nine position when engaged with said actuator.

9. In a machine of the class described, in combination, a totalizer frame, a totalizer wheel having ten positions, namely "0" to "9", an actuator, means for engaging said totalizer wheel with said actuator for adding amounts to the wheel, and means for retarding said totalizer wheel as it moves into its nine position when moved by said actuator.

In testimony whereof I affix my signature.

MAXIMILIAN M. GOLDBERG.